May 19, 1942.  S. O. EVANS  2,283,670

TRANSFORMER

Filed April 30, 1940

Inventor:
Sidley O. Evans:
by Harry E. Dunham
His Attorney.

Patented May 19, 1942

2,283,670

UNITED STATES PATENT OFFICE 2,283,670

TRANSFORMER

Sidley O. Evans, Columbus, Ohio, assignor to General Electric Company, a corporation of New York Application April 30, 1940, Serial No. 332,520

5 Claims. (Cl. 175—358)

My invention relates to transformers and is particularly applicable to instrument transformers.

An object of my invention is to provide a transformer which will have such electrical characteristics as to provide a minimum angle between the primary current and the reversed secondary current.

Another object of my invention is to provide a transformer which is designed to supply high power factor burdens but which will have a minimum of phase angle error.

I accomplish these and other objects by increasing the reactance of a circuit, which includes the secondary winding and the burden, in an improved and efficient manner. Thus, I provide a compensating or reactance winding which is so disposed on the core member that it magnetizes the core member at right angles to the main flux.

Further objects and advantages of my invention will become apparent from the following description referring to the accompanying drawing, and the features of novelty which characterize my invention will be pointed out with particularity in the claims annexed to and forming a part of this specification.

Figure 1:
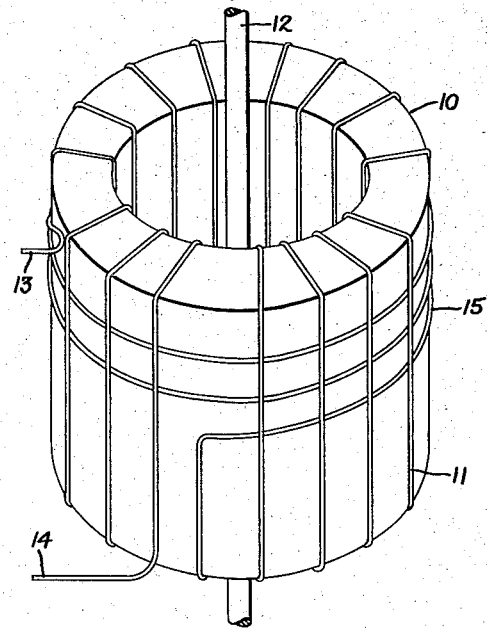
Figure 3:
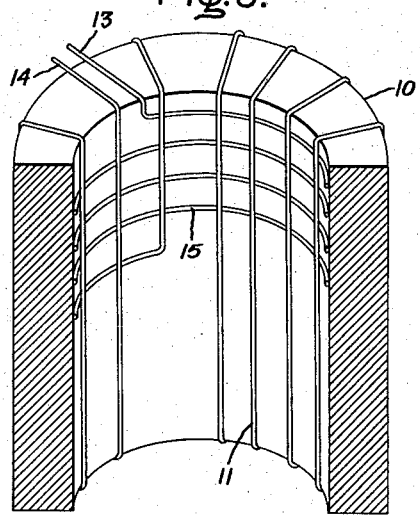
Figure 2:
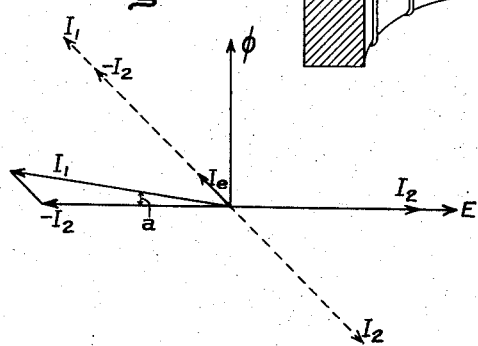

In the drawing Fig. 1 is a perspective view of a bushing transformer provided with an embodiment of my invention; Fig. 2 is a vector diagram which will be used to describe my invention; and Fig. 3 is a perspective view partially in section of a portion of a transformer provided with a modification of my invention.

Referring to the drawing, in Fig. 1 I have illustrated a current transformer having a core member 10 about which are distributed the turns of a secondary winding 11. Since the transformer illustrated in Fig. 1 is of the bushing type, the primary winding will include a conductor 12 which passes through the window of the core member substantially parallel to its longitudinal axis. In order to provide a secondary winding which will link the main flux of the transformer produced by current passing through the primary winding, the turns of the secondary winding are distributed in planes parallel with the longitudinal axis of the transformer. The secondary winding has terminals 13 and 14 which may be connected to any suitable burden such as an ammeter.

In order that the measuring instrument will give an accurate indication of the value of current flowing through the primary circuit it is desirable that a minimum of phase angle error be introduced. With a meter connected directly across the secondary terminals of a transformer of conventional design, the burden power factor will be relatively high and a large lagging phase angle will occur. To compensate for this, it has been a common practice to connect a suitable device, such as a reactance unit, in the secondary circuit so as to decrease the burden power factor, it being understood that the phase angle of the transformer will be a minimum, or zero when the power factor of the burden is equal and opposite to the power factor of the exciting current, or, in other words, when the secondary current is 180 degrees out of phase with the primary exciting current. For example, let us assume that a conventional transformer supplies a substantially unity power factor load, such as an ammeter. The electrical conditions in such a case may be illustrated by the solid line vectors of Fig. 2. Thus, the phase angle which is marked $a$ is that angle between the reversed secondary current $-I_2$ and the primary current $I_1$, $I_1$ being the vector sum of $-I_2$ and the total magnetizing current, $I_e$. Such a relatively large phase angle is particularly undesirable when the transformer is employed as an instrument transformer. It will be seen, however, that when the proper value of reactance is added to the secondary winding burden circuit, so that the secondary current, $I_2$, is made to lag the secondary voltage by some suitable angle such that $I_2$ will approach or be substantially 180 degrees out of phase with the primary exciting current $I_e$, the angle $a$ will be decreased. This result, that is, with $a$ equal to zero is shown by the dotted vectors in Fig. 2. While such a condition may be approximated by the use of an external reactance unit, I provide an improved transformer structure which will have a minimum of phase angle error, when supplying a high power factor burden, without the use of any additional external equipment. Thus with my improved structure all problems of accommodating and mounting extra equipment external to the transformer are dispensed with. I accomplish this by providing a compensating or reactance winding 15, the turns of which being wound in planes perpendicular to the longitudinal axis of the core member, or perpendicular to the turns of the secondary winding. In this manner I am able to increase the reactance of the secondary winding circuit by means of a supplementary winding without injuring the efficiency of the transformer structure. Thus, the reactance winding 15 is wound so that it will magnetize the core member at right angles to the main flux. The reactance winding 15 may include a number of turns of the same wire which is used in winding the secondary winding 11. Thus, the reactance winding will be connected in series with the secondary winding 11 without the necessity of any mechanical connectors. In addition, I have found that when the reactance winding is so provided, it is almost impossible when inspecting the finished transformer to determine that there is in fact a reactance winding disposed around the core member.

In Fig. 1, I have illustrated the turns of the reactance winding being disposed around the outside periphery of the annular core member. However, as is shown in Fig. 3, the turns of this reactance winding may be disposed around the inside surface of the core member.

I have illustrated my invention as applied to a current transformer, since I have found that it has efficient application to such a transformer, but it is to be understood that my invention is not to be limited to such an application, it being also applicable to potential transformers or any other type of transformer.

In view of the foregoing it will be seen that I have provided a simple and improved arrangement for minimizing the phase angle of transformers when they feed very high power factor loads. To accomplish this I provide a compensating winding which surrounds the core member so as to magnetize it in a direction at right angles to the main flux so that the compensating or reactance winding will not interfere with the turn ratio of the primary and secondary windings. I have found such a structure to be a very efficient way of producing a current transformer which will have a minimum phase angle error when feeding very high power factor burdens.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. A transformer including a core member, a primary winding, a secondary winding adapted to be connected to a relatively low reactance load, a compensating winding, and means for connecting said secondary winding in series with said compensating winding, said compensating winding being disposed so as to magnetize said core member at substantially right angles to the main flux of the transformer, and having such a value of reactance that the current of said secondary-burden series circuit will be substantially 180 degrees out of phase with the transformer magnetizing current.

2. A transformer including an annular core member, a secondary winding having turns distributed around said core member and adapted to be connected to a relatively low reactance load, a compensating winding having turns distributed around said core member, said turns of said compensating winding being disposed at substantially right angles to said turns of said secondary winding and having such a value of reactance that the current of said secondary-burden series circuit will be substantially 180 degrees out of phase with the transformer magnetizing current, and means for connecting said compensating winding in series with said secondary winding.

3. An instrument transformer including a core member, a primary winding, a secondary winding, a reactance winding, said reactance winding being disposed so as to magnetize said core member at substantially right angles to the main flux of the transformer, means for connecting said secondary winding to a relatively low reactance load, and means for connecting said reactance winding in series with said secondary winding so as to cause the current of said secondary-burden series circuit to be substantially 180 degrees out of phase with the transformer magnetizing current.

4. An instrument transformer including a core member, a primary winding, a secondary winding, a reactance winding, said reactance winding being disposed so as to magnetize said core member at substantially right angles to the main flux of the transformer, means for connecting said secondary winding to a relatively low reactance load, and means for connecting said reactance winding with said secondary winding so as to cause the current of said secondary-burden series circuit to be substantially 180 degrees out of phase with the transformer magnetizing current.

5. A current transformer including an annular core member, a primary winding passing through the window of said annular core member and substantially parallel with the longitudinal axis thereof, a secondary winding comprising a conductor forming a plurality of turns distributed around said core member in planes parallel with said longitudinal axis, and means including a plurality of turns formed of said conductor and disposed around a portion of said core member at right angles to the turns of said secondary winding for increasing the reactance of said secondary winding, said last-mentioned turns having such a value of reactance that when said secondary winding is connected in series with a low reactance load the current of the secondary burden circuit will be substantially 180 degrees out of phase with the transformer magnetizing current.

SIDLEY O. EVANS.